United States Patent
Fertig et al.

(10) Patent No.: US 9,407,373 B2
(45) Date of Patent: Aug. 2, 2016

(54) OPTICAL SYNTHESIZER TUNING USING FINE AND COARSE OPTICAL FREQUENCY COMBS

(71) Applicant: Honeywell International Inc., Morristown, NJ (US)

(72) Inventors: Chad Fertig, Bloomington, MN (US); Steven Tin, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 9 days.

(21) Appl. No.: 14/549,374

(22) Filed: Nov. 20, 2014

(65) Prior Publication Data

US 2015/0326320 A1   Nov. 12, 2015

Related U.S. Application Data

(60) Provisional application No. 61/990,023, filed on May 7, 2014.

(51) Int. Cl.
*H04B 10/00* (2013.01)
*H04B 10/50* (2013.01)
*H04B 10/508* (2013.01)

(52) U.S. Cl.
CPC ............ *H04B 10/503* (2013.01); *H04B 10/508* (2013.01)

(58) Field of Classification Search
CPC ........................... H04B 10/505; H04B 10/506
See application file for complete search history.

(56) References Cited

U.S. PATENT DOCUMENTS

| 5,233,462 A | * | 8/1993 | Wong | ........................ | G01J 9/04 |
| | | | | | 359/330 |
| 6,798,796 B2 | * | 9/2004 | Hiroshi | ................. | H01S 5/0687 |
| | | | | | 372/20 |
| 7,123,402 B1 | * | 10/2006 | Doerr | ...................... | H04J 14/02 |
| | | | | | 359/326 |

(Continued)

FOREIGN PATENT DOCUMENTS

| DE | 19514386 | 10/1996 |
| WO | 2013040168 | 3/2013 |

OTHER PUBLICATIONS

Del'Haye et al., "Self-Injection Locking and Phase-Locked States in Microresonator-Based Optical Frequency Combs", "Physical Review Letters 112", Jan. 29, 2014, Publisher: The American Physical Society.

(Continued)

*Primary Examiner* — Danny Leung
(74) *Attorney, Agent, or Firm* — Fogg & Powers LLC (57) ABSTRACT

Embodiments herein provide for an optical frequency synthesizer including a coarse optical frequency comb, a fine optical frequency comb, and an output laser. The coarse comb is pumped with a first pump laser, and an absolute frequency of at least one tooth of the coarse optical frequency comb is set. The fine comb is pumped with a second pump laser and has a frequency spacing between teeth that is locked to a fractional or integer multiple of a radio frequency reference. Initially, the second pump laser is locked to a first tooth of the coarse optical frequency comb. The optical frequency synthesizer can be tuned by sweeping the second pump laser and locking the second pump laser to a desired tooth. An output signal can then be generated with the output laser based on a tooth of fine comb after the second pump is locked to the desired tooth.

20 Claims, 4 Drawing Sheets

(56) References Cited

U.S. PATENT DOCUMENTS

| | | | | |
|---|---|---|---|---|
| 8,378,751 | B2* | 2/2013 | Fagg | H03L 7/185 331/10 |
| 8,416,819 | B2* | 4/2013 | Grebing | G02F 1/33 372/23 |
| 8,488,639 | B1* | 7/2013 | Diels | H01S 3/10092 372/13 |
| 8,558,993 | B2* | 10/2013 | Newbury | G01S 7/484 356/4.1 |
| 8,564,785 | B2* | 10/2013 | Newbury | G01J 3/453 356/451 |
| 8,565,609 | B2* | 10/2013 | Wilkinson | G04F 5/14 398/154 |
| 8,750,717 | B1 | 6/2014 | Yap et al. | |
| 2004/0018018 | A1* | 1/2004 | Izadpanah | F16K 37/0075 398/77 |
| 2004/0264977 | A1* | 12/2004 | Yap | G02F 2/02 398/161 |
| 2007/0166048 | A1 | 7/2007 | Doeer et al. | |
| 2008/0285606 | A1* | 11/2008 | Kippenberg | G02F 1/39 372/32 |
| 2013/0314703 | A1* | 11/2013 | Cox | G02F 1/3536 356/326 |
| 2015/0325978 | A1* | 11/2015 | Fertig | H01S 3/13 372/32 |
| 2015/0326320 | A1* | 11/2015 | Fertig | H04B 10/508 398/115 |

OTHER PUBLICATIONS

Del'Haye et al., "Pulse-Picked Octave-Spanning Microresonator-Based Frequency Comb for Optical Self-Referencing", May 2013, p. 1 Publisher: Notional Institute of Standards and Technology.

Hsieh et al., "Spectrally interleaved, comb-mode-resolved spectroscopy using swept dual terahertz combs", "Scientific Reports", Jan. 22, 2014, pp. 1-7.

Klee et al., "Self-referenced Spectral Phase Retrieval of Dissimilar Optical Frequency Combs via Multiheterodyne Detection", Sep. 2012, pp. 491-492, Publisher: IEEE.

Lee et al., "Discretely Tunable Optical Frequency Synthesizer Utilizing a Femtosecond Fiber Laser Injection-Locking Technique", "IEEE Photonics Technology Letters", Oct. 1, 2009, pp. 1435-1437, vol. 21, No. 19.

European Patent Office, "Extended European Search Report from EP Application No. 15164564.5 mailed Oct. 15, 2015", "from Foreign Counterpart of U.S. Appl. No. 14/549,359", Oct. 15, 2015, pp. 1-6, Published in: EP.

U.S. Patent and Trademark Office, "Office Action", "from U.S. Appl. No. 14/549,359", Dec. 9, 2015, pp. 1-18, Published in: US.

U.S. Patent and Trademark Office, Notice of Allowance, from U.S. Appl. No. 14/549,359, Mar. 28, 2016, pp. 1-13, Published in: US.

European Patent Office, Extended European Search Report from EP Application No. 15194379.2 mailed Apr. 5, 2016, EP, Apr. 5, 2016, pp. 1-7, Published in: EP.

* cited by examiner

OPTICAL SYNTHESIZER TUNING USING FINE AND COARSE OPTICAL FREQUENCY COMBS

CROSS-REFERENCE TO RELATED APPLICATIONS

This application claims the benefit of U.S. Provisional Patent Application Ser. No. 61/990,023, filed on May 7, 2014, which is hereby incorporated herein by reference.

BACKGROUND

Accurate, tunable optical synthesis has potential applications in standoff effluent characterization, high-bandwidth and secure communications, optical spectroscopy, gas sensing, LiDAR, optical-carrier atomic clocks, and atomic and optomechanical inertial sensors. Current state-of-the-art optical synthesizers are limited to laboratory use due to the size, cost, and power requirements.

Optical synthesizers that achieve accurate and stable optical output over a wide range (such as the C-band optical communications range of 1530-1565 nm), have output light that is locked to a highly stable and accurate optical reference with feedback control in the radio frequency (RF) domain. For large scale optical synthesizers, self-referenced optical frequency combs based on titanium-sapphire or fiber-laser based femtosecond mode-locked laser sources are used to reference optical output to microwave inputs, enabling optical synthesis. These devices are available commercially, are as large as a refrigerator, and use large amounts of power.

Significant efforts have been taken in the last few years to develop self-referenced optical frequency combs based on micro-resonators, which use much less power to operate than the tradition mode-locked laser based optical frequency combs. However, optical frequency combs operate by self-referencing in an optical interferometer. This has not been achieved using micro-resonators because of an inability to control micro-resonators with fine comb tooth spacing while simultaneously being excited with laser power in excess of 1 watt, which is used to create combs wide enough (e.g., octave spanning) to self-reference.

SUMMARY

Embodiments herein provide for an optical frequency synthesizer including a coarse optical frequency comb, a fine optical frequency comb, and an output laser. The coarse optical frequency comb is pumped with a first pump laser, and an absolute frequency of at least one tooth of the coarse optical frequency comb is set. The fine optical frequency comb is pumped with a second pump laser and has a frequency spacing between teeth that is locked to a fractional or integer multiple of a radio frequency reference. Initially, the second pump laser is locked to a first tooth of the coarse optical frequency comb. The optical frequency synthesizer can be tuned by sweeping the second pump laser to near a desired tooth of the coarse optical frequency comb, and locking the second pump laser to the desired tooth. An output signal can then be generated with the output laser based on a tooth of fine optical frequency comb after the second pump is locked to the desired tooth.

DRAWINGS

Understanding that the drawings depict only examples and are not therefore to be considered limiting in scope, the examples will be described with additional specificity and detail through the use of the accompanying drawings, in which.

In accordance with common practice, the various described features are not drawn to scale but are drawn to emphasize specific features relevant to the examples. Like reference numbers and designations in the various drawings indicate like elements.

DETAILED DESCRIPTION

The subject matter described herein provides for an optical frequency synthesizer based on two optical frequency combs. The optical frequency synthesizer has a fine tuning resolution over a wide tuning range with reduced laser power requirements.

Figure 1:
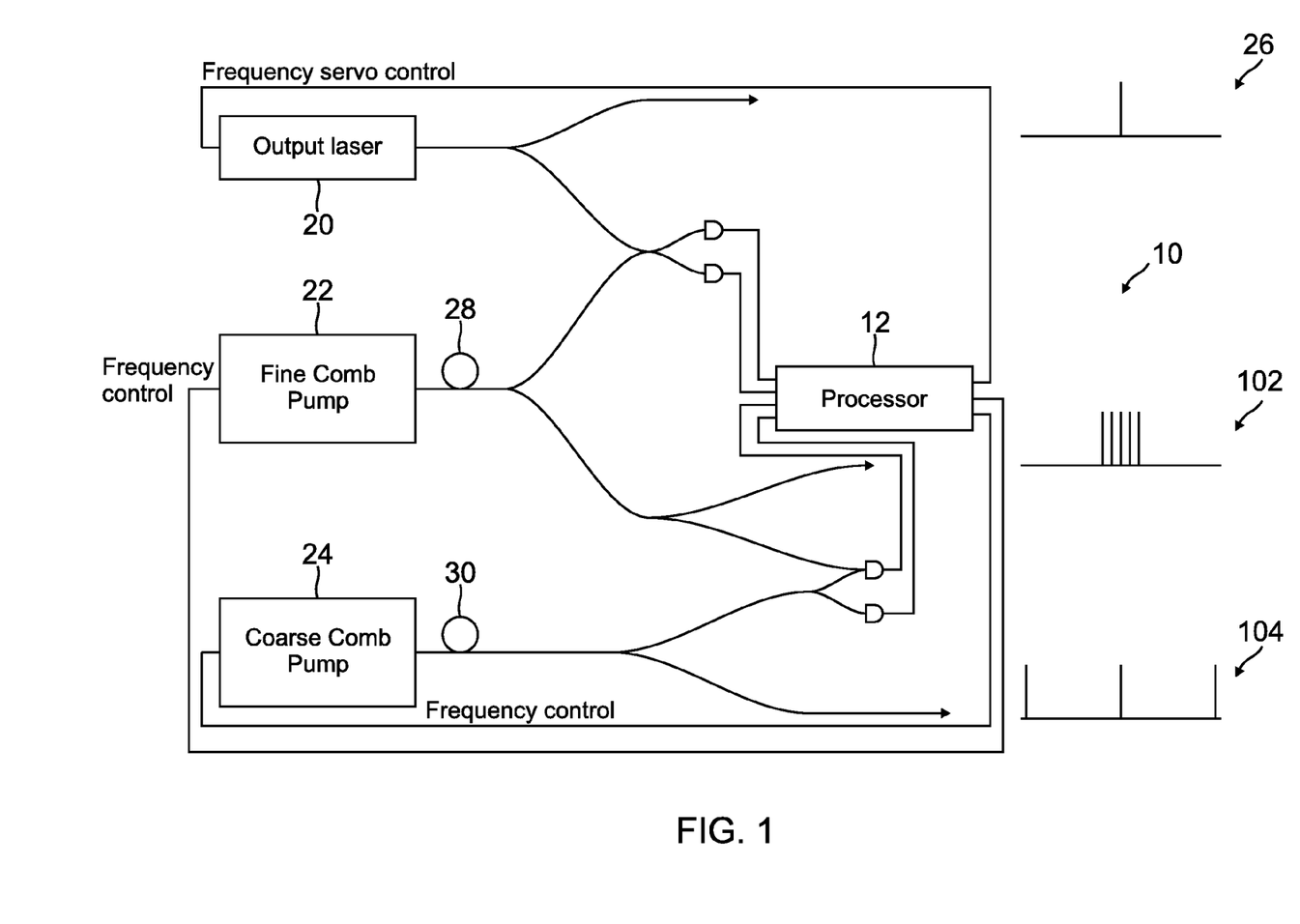
FIG. 1 is diagram illustrating an example optical frequency synthesizer based on two optical frequency combs.

FIG. 1 is a diagram illustrating an example of such an optical frequency synthesizer 10. The optical frequency synthesizer 10 includes a fine optical frequency comb (FC) 102 and a coarse optical frequency comb (CC) 104. The FC 102 has a relatively fine spacing while the CC 104 has a comparatively coarse spacing. The synthesizer 10 also includes a processing device 12 (e.g., a microprocessor) and an output laser 20.

In an example, the FC 102 can be generated by pumping a first resonator 28 (e.g., a micro-resonator) for the FC 102 with a first pump laser 22 and the CC 104 can be generated by pumping a second resonator 30 with a second pump laser 24. In an alternative example, the FC 102 can be generated by providing the signal from the first pump laser 22 to a modulator. In another example, the FC 102 can be generated by providing the signal from the first pump laser 22 to a modulator, and providing an output from the modulator to a resonator.

Figure 2:
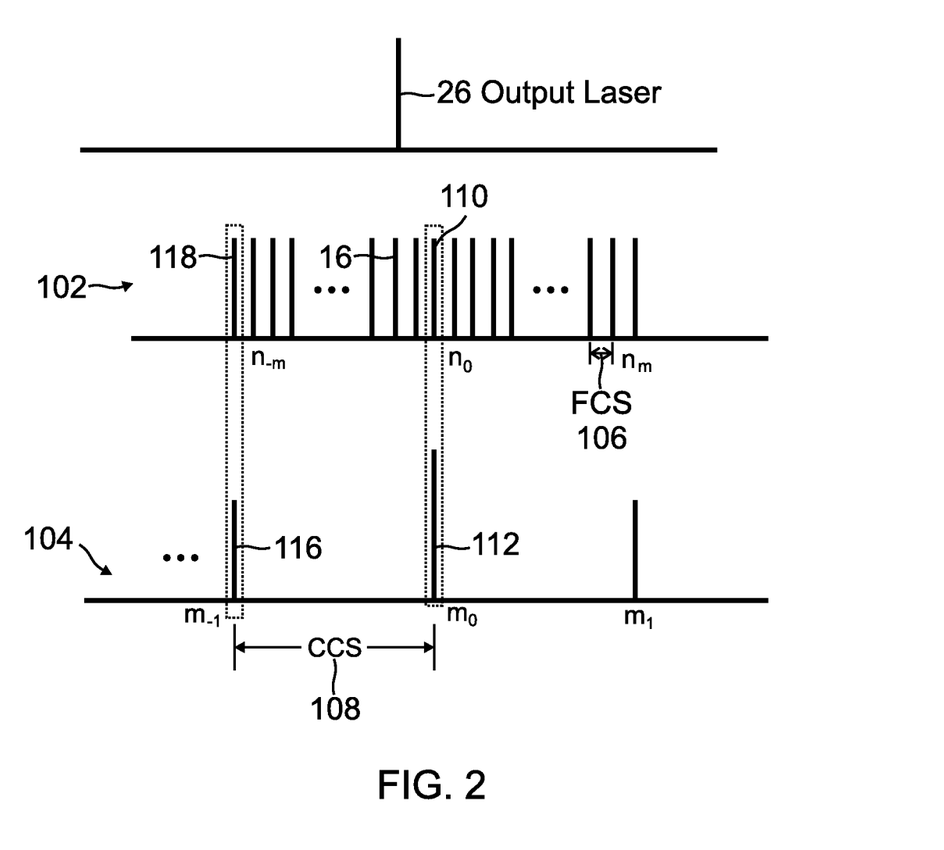
FIG. 2 is a graph illustrating an example output of the optical frequency synthesizer along with example outputs of the two optical frequency combs.

FIG. 2 is a diagram illustrating an example output light 26 of the output laser 20, the FC 102, and the CC 104. The frequency offset of the CC 104 is set. In an example, the frequency offset is set by self-referencing two teeth of the CC 104. As known, in order to enable such self-referencing, the CC 104 spans an optical octave. For example, there are many pairs of teeth ($n_1$, $n_2$) in the CC 104 which might satisfy the relation that 2*frequency ($n_1$) is approximately equal to frequency ($n_2$) (i.e., a pair of teeth that are an octave apart). The optical frequency of each tooth can be written frequency ($n_1$)=$f_o$+$n_2$*CCS. If the $n_1$ tooth is doubled in a nonlinear medium, and a heterodyne beat note is made with the $n_2$ tooth, the beat note may be processed to identify the frequency offset. The frequency offset can be as large as CCS/2 in the worst case which may be too high in frequency to detect directly with a photo-receiver. Accordingly, if the self-referencing beat note frequency is outside the bandwidth of the detector, no beat note will be observed. If no beat note is observed, the pump lasers 22, 24 for the FC 102 and CC 104 can be swept (up and/or down) to find the beat note, but need not be swept by more than ½*CCS 108. The beat note can be detected with the processing device 12 and appropriate detectors. The processing device 12 can then send a signal to the pump lasers 22, 24 to adjust the frequency of the pump lasers 22, 24 in order to set the frequency offset at the desired point. In an alternative example, instead of using a self-referencing interferometer, the frequency offset is set by referencing the pumps 22, 24 (i.e., the $m_0$ tooth of the CC 104) to another sufficiently stable laser, such as the output of an optical atomic clock.

In an example, the CC 104 is independently stable, such that the absolute frequency of the teeth of the CC 104 is known. In another example, the CC 104 can be stabilized by forming a mutual lock between the CC 104 and the FC 104. Such a mutual lock is explained in more detail below.

In one example, the radio frequency reference is used to directly modulate the fine comb pump laser 22, creating a FC 102 having an FCS 106 equal to a fractional or integer multiple of the RF reference. In another example, the FCS 106 is detected using radio frequency electronics, and stabilized to a radio frequency reference by closed loop control of the fine comb resonator free spectral range. The FCS 106 of the FC 102 is selected to be small enough such that the FCS 106 can be within the desired error range based on locking the FCS 106 to a stable RF reference. In an example, the stable RF reference is at 10 MHz, and the FCS 106 is generated based on fractional or integer multiple of 10 MHz, such as 20 GHz.

A first tooth 110 of the FC 102 can be locked to a second tooth 112 of the CC 104. In an example, the first tooth 110 can be locked to the second tooth 112 of the CC 104 by controlling the second pump laser 24 such that the second pump laser 24 is locked to the first pump laser 22. In particular, the processing device 12 along with appropriate detectors can be configured to detect differences in the frequency between the first pump laser 22 and the second pump laser 24 and to control the second pump laser 24 based thereon to lock the second pump laser 24 to the first pump laser 24. When the FC 102 and the CC 104 are locked to pumped lasers which are locked to one another, at least one tooth of the FC 102 and CC 104 will be at the frequency of the pump lasers 22, 24. In an example, two of those tooth frequencies are the first tooth 110 (e.g., the center tooth "$n_0$") of the FC 102 and the second tooth 112 (e.g., the center tooth "$m_0$") of the CC 104.

With the center tooth of the FC 102 locked to the center tooth of the CC 104, the absolute frequency of the teeth of the FC 102 is known. Accordingly, the output signal 26 can be generated based on the teeth of the FC 102. To generate such an output signal 26, the processing device 12 is coupled to the output laser 20 and the FC 102, such that the processing device 12 can detect a frequency difference between the light 26 from the output laser 12 and a selected tooth of the FC 102. The processing device 12 is also configured to control the output laser 20 to adjust the frequency of the light 26 therefrom. In an example, the processing device 12 is a direct digital synthesizer (DDS) that operates in the microwave band based on an external RF reference signal.

In operation, the processing device 12 receives a signal indicating a desired output frequency for the light 26 from the output laser 20. This signal can be received from any suitable source, such as a higher level computing system, which receives inputs from a human. The processing device 12 selects a tooth 16 of the FC 102 that is nearby the desired output frequency. In an example, the processing device 12 selects the tooth 16 of the FC 102 that is closest to the desired output frequency. The processing device 12 then detects a frequency difference between the selected tooth 16 of the FC 102 and the frequency of the light 26 from the output laser 20. Based on the detected frequency difference, the processing device 12 controls the output laser 20 such that the light 26 is set at the desired output frequency. In particular, the processing device 12 controls the output laser 20 such that the light 26 therefrom is set at an optical offset frequency lock (OOFL) away from the selected tooth 16 of the FC 102, where the optical offset frequency is equal to the difference between the desired output frequency and the frequency of the selected tooth 16 of the FC 102. In particular, the processing device 12 can generate a frequency signal that is sent to the output laser 20, and the frequency of the light 26 generated by the output laser 20 is based on the frequency of the signal received from the processing device 12 (e.g., DDS). The frequency of the signal sent from the processing device 12 (e.g., DDS) to control the output laser 20 is referred to herein as the delta frequency.

Based on the input signals received indicated the desired output frequency for the output light 26, the processing device 12 can control the frequency of the light 26 by adjusting the delta frequency and/or which tooth of the FC 102 is selected. In an example, the FCS 106 is set to 20 GHz or less in order to match with the tuning range of the processing device 12 (e.g., DDS). In an example, the delta frequency is set to a frequency between 0 Hz and FCS 106, which can be done with sub-hertz accuracy with the processing device 12 (e.g., DDS).

In an example, the CCS 108 is at least 10 times larger than the FCS 106. Such a difference in frequency spacing provides for the optical synthesizer 10 a wide overall frequency range based on the CCS 108 and a fine frequency resolution based on the FCS 106 with a relatively low power requirement. In an implementation of this example, the CCS 108 is at least 50 times larger than the FCS 106.

Figure 3:
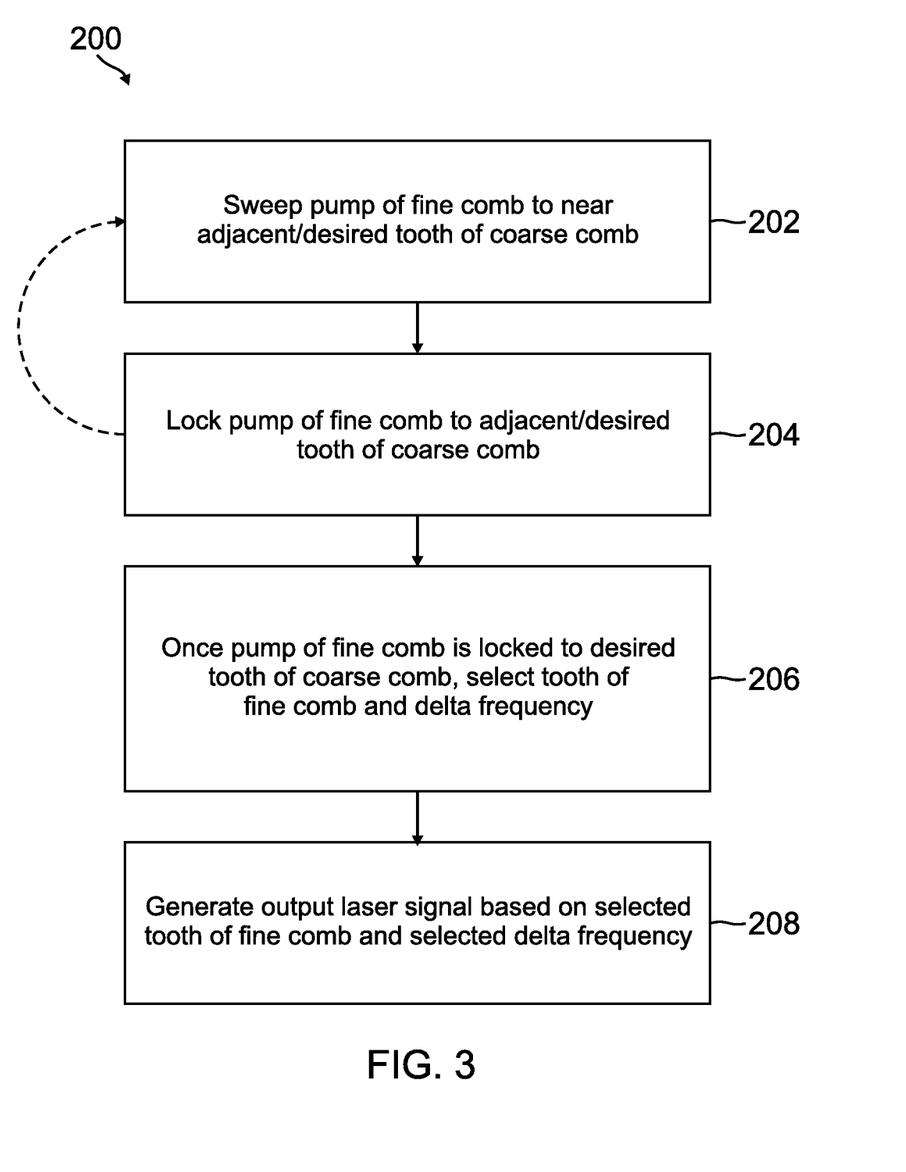
FIG. 3 is a flow diagram of an example method for tuning the synthesizer of FIG. 1, if the two optical frequency combs are not mutually-referenced.

FIG. 2 is a flow diagram of an example method 200 of tuning the optical frequency synthesizer 10. In particular, the method 200 is for tuning the optical frequency synthesizer 10 in a range wider than the range of the FC 102. The method 200 enables tuning of the optical frequency synthesizer 10 in a wide range based on the CC 104 with a fine resolution based on the FC 102.

As discussed above, the first pump 22 can be initially locked to the second pump 24 of the CC 104, which locks the first pump 22 to the center tooth of the CC 104. This lock results in a frequency range for the FC 102 being the frequency of the center tooth of the CC 104 plus and minus half the frequency range of the FC 102. If the resulting range of the FC 102 does not overlap with the desired frequency of the output laser 20, method 200 can be used to move the frequency range of the teeth of FC 102, such that the desired output frequency of the output laser 20 is within the frequency range of the FC 102.

To move the frequency range of the teeth of the FC 102, the first pump 22 of the FC 102 is locked to a different tooth of the CC 104, wherein that different (desired) tooth is a tooth that is nearby the desired frequency of the output laser 20. In an example, the first pump 22 is locked to the tooth of the CC 104 that is closest to the desired frequency of the output laser 20. The first pump 22 can be locked to a different tooth by sweeping the first pump 22 toward the different tooth (block 202), and then locking the first pump 22 to that different tooth (block 204). One or more incremental sweeps and locks can be used to move the first pump 22 to the different tooth as discussed below. If the different tooth is higher than the center tooth of the CC 104, the first pump 22 is swept downward. If the different tooth is lower than the center tooth, the CC 104 is swept upward.

In an example, the first pump 22 is moved from the center tooth of the CC 104 to the desired tooth by incrementally locking the first pump 22 to each adjacent tooth of the CC 104, one after another, to step the first pump 22 from the center tooth of the CC 104 to the desired tooth. For example, if the desired tooth is the $n_{-3}$ tooth of the CC 104, the first pump 22 can first be swept from the center tooth ($n_0$ of the CC 104 to the n−1 tooth of the CC 104, and locked to the $n_{-1}$ tooth. After locking to the $n_{-1}$ tooth, the first pump 22 can be swept from the $n_{-1}$ tooth to the $n_{-2}$ tooth of the CC 104, and locked to the $n_{-2}$ tooth. After locking to the $n_{-2}$ tooth, the first pump 220 can be swept from the $n_{-2}$ tooth to the $n_{-3}$ tooth and locked to the $n_{-3}$ tooth.

In an alternative example, the first pump 22 is swept from the center tooth of the CC 104 directly to the desired tooth. For example, if the desired tooth is the $n_{-3}$ tooth of the CC 104, the first pump 22 can be swept from the center tooth, past the $n_{-1}$ and $n_{-2}$ teeth, directly to the $n_{-3}$ tooth. In an implementation of this alternative example, it can be determined when the first pump 22 is nearing the desired tooth of the CC 104 by counting the teeth of the CC 104 as the first pump 22 passes them by during the sweep from the center tooth to the desired tooth. The teeth that the first pump 22 passes can be identified by detecting the resulting beat note from the mixing of the FC 102 with the CC 104 as the FC 102 is swept. In some implementations, the sidebands of the FC 102 can be turned off during sweeping to more easily identify such a beat note. In any case, each tooth that the FC 102 passes will create a corresponding beat note and each of these beat notes can be counted to determine how many teeth the FC 102 has been swept passed. In this way, the teeth from the center tooth to the desired tooth can be counted as the FC 102 is swept to identify when the FC 102 is nearby by the desired tooth.

Either of these processes for moving the first pump 22 can be used to move the first pump 22 from any tooth of the CC 104 to any other tooth of the CC 104. That is, the above processes are not limited to beginning from the center tooth.

To sweep the first pump 22 from a first tooth (e.g., the center tooth) of the CC 104, to a second tooth (e.g., the $n_{-3}$ tooth) of the CC 104, the first pump 22 can be initially swept in an open loop manner based on the tuning characteristics of the CC 104 to get close to the second tooth of the CC 104. A beat note between the FC 102 and the CC 104 can be detected with a photodetector when the first pump 22 is nearby the second tooth of the CC 104. A servo loop can then be used to the lock the first pump 22 to the second tooth of the CC 104 based on the beat note. The detection bandwidth and the capture range of the servo loop can be selected based on how accurately the first pump 22 can be tuned in an open loop manner and based on the maximum frequency range in which the first pump 22 is to be tuned in a single sweep. For example, if the first pump 22 is moved to a desired tooth of the CC 104 by incrementally locking to each adjacent tooth as discussed above, the maximum frequency range in which the first pump 22 is to be tuned is equal to CCS 108. In examples where the first pump 22 is swept directly to a desired tooth by passing over teeth between the current tooth and the desired tooth, the maximum frequency range in which the first pump 22 is to be tuned is likely much larger. Accordingly, a larger detection bandwidth and/or capture range will likely be used in examples where the first pump 22 is swept directly to a desired tooth.

In an example, the first pump 22 is moved by incrementally locking the first pump 22 to each adjacent tooth, and the detection bandwidth and the capture range of servo loop are not as large as the FCS 106 of the FC 102. In an implementation of such an example, the tuning characteristics of the first pump 22 are known enough to tune in an open loop manner to within 1 Ghz of the next adjacent tooth, and the detection bandwidth of the servo loop is around 1 Ghz.

Once the FC 102 is locked to the desired tooth of the CC 104, the teeth of the FC 102 span from frequency of the desired tooth of the CC 104 plus and minus half of the frequency range of the teeth of the FC 102. A desired tooth 16 of the FC 102 can then be selected and used along with the delta frequency 14 produced by the processing device 12 (block 206) in order to generate a desired OOFL (block 208) as discussed above.

Using this method 200, the OOFL 18 can be tuned to anywhere within the range of the CC 104, while having a tuning resolution based on the FC 102. Since the power required to generate an optical comb increases as the number of teeth increases, the using the FC 102 and the CC 104 can reduce the optical power required to generate such a tuning range and resolution for the optical synthesizer 10, because a single optical frequency comb is not needed to achieve both wide output range and narrow tooth spacing.

As mentioned above, in some examples, the CC 104 can be stabilized by forming a mutual lock between the CC 104 and the FC 102. Such a mutual lock is referred to herein as mutually-referenced optical frequency combs. Mutually referencing the FC 102 and CC 104 allows for a procedure to unambiguously identify the fine comb tooth frequencies without requiring a pump laser wavelength to be known with the accuracy of the fine tooth spacing. Examples of such mutually-referenced combs are provided in U.S. patent application Ser. No. 14/549,359, titled "Mutually-Referenced Optical Frequency Combs", which is hereby incorporated herein by reference.

In such mutually-referenced optical frequency combs, the FC 102 has a FCS 106 locked to an integer or fractional multiple of a RF reference, and a first tooth of the FC 102 is locked to a second tooth of the CC 104 as discussed above. In addition to that discussed above, however, the CCS 108 of the CC 104 is locked to an integer multiple of the FCS 106. In an example, the FCS 106 is 20 GHz and the integer multiple is 50 such that the CCS 108 is 1000 GHz. The width of the FCS 106 and the CCS 108 are selected such that the teeth of the FC 102 span at least the width of the CCS 108 to enable such a lock.

The CCS 108 can be locked to an integer multiple of the FCS 106 by locking a third tooth (e.g., $n_{-1}$) 116 of the CC 104 to a fourth tooth (e.g., $n_{-m}$) of the FC 102. As used herein "±X" is a number indicating the number of teeth and direction away from the center tooth "$n_0$", where the 'X' is replaced with a number. Accordingly, the "$n_{-1}$" tooth is the tooth that is adjacent in the negative direction to the center tooth "$n_0$". Likewise, the "$n_{-m}$" tooth is the tooth that is "M" away from the center tooth "$n_0$" in the negative direction. By locking the third tooth 116 to the fourth tooth 118 along with locking the second tooth 112 to the first tooth 110, the CCS 108 is locked to an integer multiple of the FCS 106. In an example, the third tooth 116 is an adjacent tooth to the second tooth 108 such that the third tooth 116 is separated from the second tooth by the CCS 108. In an example, the third tooth 116 is locked to the fourth tooth 118 by setting a free spectral range (FSR) of a resonator for the CC 104 such that a beat frequency between an output of the FC 102 and an output of the CC 104 corresponds to the third tooth 116 being aligned with the fourth tooth 118.

In an example, the third tooth 116 can be locked to the fourth tooth 118 by sweeping the FSR of the resonator 30 for the CC 104. The fourth tooth 118 can be selected from any desired tooth of the FC 102 that permits locking to the third tooth 116. The FSR of the resonator 30 can be swept, for example, by temperature tuning the cavity length or by other means. While the FSR of the resonator 30 is swept, the radio frequency, f(beat), of the optical beat note between the FC 102 and the CC 104 is monitored.

Sweeping the FSR of the resonator 30 causes the CCS 108 change. With tooth $m_0$ (e.g., the second tooth 112) of the CC 104 locked to tooth $n_0$ (e.g., the first tooth 110) of the FC 102, tooth $m_1$ (e.g., the third tooth 116) of the CC 104 moves across the $n_1$, $n_2$, $n_3$, etc. teeth of the FC 102. The $m_1$ tooth 116 can then be locked to any tooth ($n_1$, $n_2$, $n_3$, etc.) of the FC 102 based on the rate of change of the frequency of the beat note between the FC 102 and the CC 104, as the CCS 108 is varied with respect to the FC 102. In particular, as the $m_1$ tooth 116 sweeps across the teeth of the FC 102, the racing rate (RR), $$RR = \frac{df(\text{beat})}{dFCS},$$

of the beat note is monitored.

In an example, the racing rate can be monitored by applying a small dither to the FCS 106. The dither of the FCS 106 generates a sawtooth shape on the beat note between the FC 102 and the CC 104. The racing rate is the slope of the downward edge of the sawtooth shape in the beat note. The racing rate has a value that depends proportionately on the number of teeth between the $n_0$ tooth 110 and the tooth ($n_1$, $n_2$, $n_3$, etc.) of the FC 102 upon which the $m_1$ tooth 116 of the CC 104 is interfering with to create the beat note. In particular, the racing rate moves closer to infinity (a vertical slope) the farther the tooth ($n_1$, $n_2$, $n_3$, etc.) of the FC 102 that is interfering with the $m_1$ tooth 116 of the CC 104 is away from the $n_0$ tooth 110. Based on this phenomenon, it can be determined when the $m_1$ tooth 116 of the CC 104 is overlapping with the tooth (fourth tooth) 118 of the FC 102 in which it is desired to lock the $m_1$ tooth to. In particular, RR=b·q, for some constant b which depends on the method of dithering the FCS 106. When the $m_1$ tooth 116 overlaps the desired (fourth) tooth 118, the racing rate equals a predetermined value for the fourth tooth 118. At that point, a servoloop can be engaged which holds the FSR of the resonator 30 of the CC 104 to lock the third tooth 116 to the fourth tooth 118. Once this occurs, all of the teeth of the CC 104 are spaced by the integer multiple of the FCS 106. Notably, this can be accomplished without having to detect a beat note having a frequency of the CCS 108.

The lock between the first tooth 110 and the second tooth 112, the lock between the FCS 106 and the RF reference, the lock between the third tooth 116 and the fourth tooth 118, and the self-referenced lock of the CC 104 are all be maintained concurrently to provide the mutually-referenced combs. By locking the first tooth 110 to the second tooth 112 and by locking the FCS 106 to the CCS 108, the frequency offset of the FC 102 can be set even if the FC 102 does not span an optical octave by setting the frequency offset of the CC 104 which automatically sets the frequency offset of the FC 102 by virtue of the FC 102 being locked to the CC 104. In particular, the FC 102 and CC 14 outputs slide (up and/or down) in concert with the pump lasers 22, 24, which are locked together. The CCS 108 does not change as this occurs since it is locked to the integer multiple of the FCS 106. In this way, the frequency offset of the FC 102 can be set (e.g., adjusted) even though the FC 102 may not span an optical octave.

When using mutually-referenced optical frequency combs, tuning of the output laser 20 within the range of the FC 102 can be accomplished in the same manner as discussed above. That is, the frequency of the output laser 20 can be selected by selecting a desired tooth 16 of the FC 104 along with the delta frequency produced by the processing device 12 in order to generate a desired OOFL.

Tuning of the output laser 210 over a wide range can be accomplished by bootstrap locking the first pump 22 for the FC 102 to any desired tooth of the CC 104, and then using any desired tooth of the FC 102 to produce the OOFL. This is similar to the method 200 discussed above.

Figure 4:
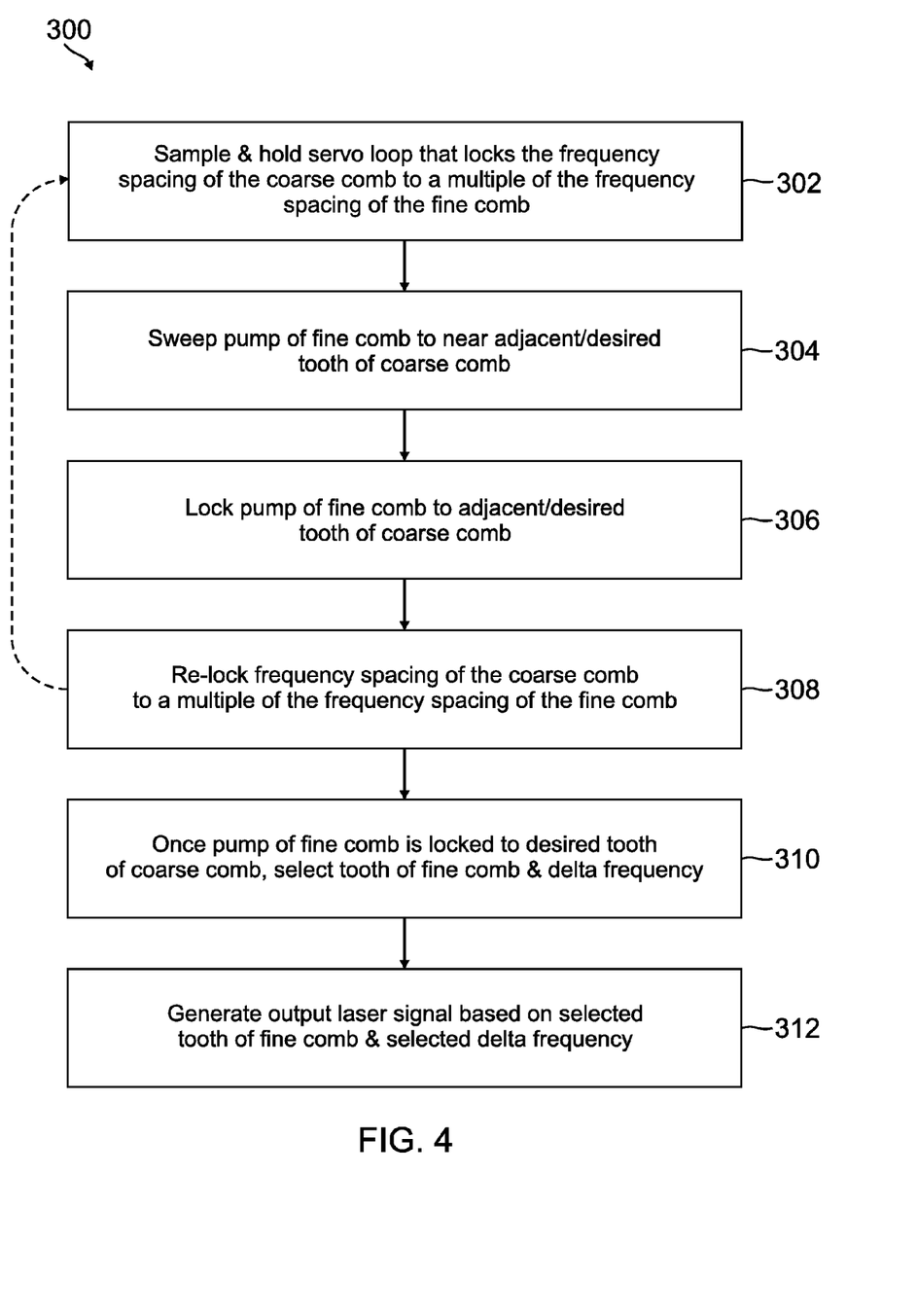
FIG. 4 is a flow diagram of an example method for tuning the synthesizer of FIG. 1, if the two optical frequency combs are mutually-referenced.

FIG. 3 is a flow diagram of an example method 300 for tuning the optical frequency synthesizer 10 when using mutually-referenced optical frequency combs. Similar to method 200, initially, the first pump 22 can be locked to the second pump 24 of the CC 104, which locks the first pump 22 to the center tooth of the CC 104.

To move the frequency range of the teeth of the FC 102, the first pump 22 of the FC 102 is locked to a different tooth of the CC 104 as discussed above with respect to a synthesizer 10 using non-mutually-referenced optical combs. In a synthesizer 10 that is using mutually-referenced optical combs, the process for locking the first pump 22 of the FC 102 to a different tooth of the CC 104 is slightly different than the process described for non-mutually-referenced optical combs. Notably, since in mutually-referenced optical combs the frequency spacing (CCS) 108 of the CC 104 is locked to a multiple of the frequency spacing (FCS) 106 of the FC 102, the FC 102 cannot be swept to a different tooth in the manner discussed above.

Accordingly, to move the frequency range of teeth of an FC 102 that is mutually-referenced with a CC 104, the control parameters of the servo loop locking the CCS 108 to a multiple of the FCS 106 are sampled and held (block 302), which de-locks from the FCS 106. In the example described above where the CCS 108 is locked to the FCS 106 by locking the third tooth 116 of the CC 104 to the fourth tooth 118 of the FC 102, the servo loop locking the third tooth 116 to the fourth tooth 118 is sampled and held, which de-locks the third tooth 116 from the fourth tooth 118.

While the servo loop for the CCS 108 is sampled and held, the first pump 22 is swept to the desired tooth of the CC 104 (block 304) and locked to the desired tooth (block 306) in any of the manners discussed above with respect to the non-mutually-referenced optical combs. For example, the first pump 22 can be moved from the center tooth of the CC 104 to the desired tooth by incrementally sweeping and locking the first pump 22 to each adjacent tooth, or by sweeping the first pump 22 directly to the desired tooth. Once the first pump 22 is locked to the desired tooth of the CC 104, the CCS 108 can be re-locked to the FCS 106 (block 308) in the manner discussed below, which re-establishes the mutual reference between the CC 104 and the FC 102.

In examples where the first pump 22 is moved by incrementally locking to each adjacent tooth, the servo loop for the CCS 108 of the CC 104 can be re-locked to each adjacent tooth, after the first pump 22 is locked to that respective tooth. In examples where locking the CCS 108 to the FCS 106 included locking the third tooth 116 to the fourth tooth 118, re-locking the CCS 108 to the FCS 106 includes locking the adjacent tooth to the third tooth 116 to the fourth tooth 118. That is, since the FC 102 has been shifted up or down CC 104 by one tooth, the adjacent tooth to the third tooth 116 should be locked with the fourth tooth 118 to maintain the same CCS 108 relationship as prior to the shift of the FC 102. For example, if the center tooth of the FC 102 is initially locked to the center tooth of the CC 104 and the $n_{-1}$ tooth of the CC 104 is initially locked to the $n_{-m}$ tooth of the FC 102, after sweeping the first pump 22 such that the center tooth of the FC 102 is locked to the $n_{-1}$ tooth of the CC 104, the CCS 108 is re-locked by locking the $n_{-2}$ tooth of the CC 104 (the adjacent tooth to the $n_{-2}$ tooth) to the $n_{-m}$ tooth of the FC 102. Notably, the adjacent tooth to the third tooth 116 that is used for re-locking is the adjacent tooth in the same direction as the direction of sweeping of the first pump 22.

Once the CCS 108 is re-locked to the FCS 106, the servo loop for the CCS 108 can again be sampled and held, which again de-locks the CCS 108 from the FCS 106. While the servo loop is sampled and held, the first pump 22 can again be swept from the current tooth to the next adjacent tooth. Once the first pump 22 is locked to the next adjacent tooth, the CCS 108 can again be re-locked to the FCS 106 as discussed above. This process is repeated until the FC 102 has been stepped up to the desired tooth of the CC 104, such that the first pump 22 is locked to the desired tooth. Once the first pump 22 is locked to the desired tooth of the CC 104, the CCS 108 can be re-locked to the FCS 106 in the manner discussed above, which again mutually-references the CC 104 and the FC 102.

In examples where the first pump 22 is swept directly to the desired tooth of the CC 104, the first pump 22 can be swept in any of the manners discussed above with respect to the non-mutually-referenced optical combs. Once the first pump 22 is locked to the desired tooth of the CC 104, the CCS 108 of the CC 104 can be re-locked to the FCS 106 in the manner discussed above, except the tooth of the CC 104 that is locked to the fourth tooth 118 of the FC 102 is the tooth that is M teeth away from the third tooth 116, where M is the number of teeth that the desired tooth (that the first pump 22 is locked to) is away from the tooth that the first pump 22 was locked to prior to the sweep. In this way, the same CCS 108 to FCS 106 relationship is maintained after the sweep as prior to the sweep.

Once the FC 102 and the CC 104 are mutually-referenced and the first pump 22 is locked to the desired tooth of the CC 104, a desired tooth 16 of the FC 102 can then be selected and used along with the delta frequency produced by the processing device 12 (block 310) in order to generate a desired OOFL (block 312) as discussed above.

Example Embodiments

Example 1 includes an optical frequency synthesizer comprising: a coarse optical frequency comb pumped with a first pump laser, wherein an absolute frequency of at least one tooth of the coarse optical frequency comb is set; a fine optical frequency comb having a frequency spacing between teeth that is locked to a fractional or integer multiple of a radio frequency reference, the fine optical frequency comb pumped with a second pump laser, wherein the second pump laser is initially locked to a first tooth of the coarse optical frequency comb; and an output laser; wherein the optical frequency synthesizer is configured to: sweep the second pump laser to near a desired tooth of the coarse optical frequency comb; lock the second pump laser to the desired tooth; and generate an output signal with the output laser based on a tooth of fine optical frequency comb after the second pump is locked to the desired tooth.

Example 2 includes the optical frequency synthesizer of Example 1, wherein the optical frequency synthesizer is configured to repeat the sweep and lock of the second pump laser for each tooth between the first tooth and the desired tooth to incrementally step the second pump laser from the first tooth to the desired tooth.

Example 3 includes the optical frequency synthesizer of Example 1, wherein sweep the second pump laser includes sweep the second pump laser from the first tooth, and while sweeping the second pump laser, count any teeth of the coarse optical frequency comb that the second pump laser passes, and determine that the second pump laser is near the desired tooth based on the number of teeth that have been passed during the sweep.

Example 4 includes the optical frequency synthesizer of Example 3, wherein count any teeth includes identify any teeth by detecting a resulting beat note from a mixing of the fine optical frequency comb with the coarse optical frequency comb.

Example 5 includes the optical frequency synthesizer of Example 4, wherein the optical frequency synthesizer is configured to turn off sidebands of the fine optical frequency comb during the mixing.

Example 6 includes the optical frequency synthesizer of any of Examples 1-5, wherein a third tooth of the coarse optical frequency comb is initially locked to a fourth tooth of the fine optical frequency comb with a servo loop such that the fine optical frequency comb and the coarse optical frequency comb are mutually-referenced, wherein the optical frequency synthesizer is configured to: sample and hold the servo loop prior to the sweep and lock of the second pump laser to the second tooth; and after the lock of the second pump laser to the desired tooth, re-lock a fifth tooth of the coarse optical frequency comb to the fourth tooth of the fine optical frequency comb, wherein the fifth tooth is an equal number of teeth away from the desired tooth as the third tooth is away from the first tooth.

Example 7 includes the optical frequency synthesizer of Example 6, wherein the optical frequency synthesizer is configured to: repeat the sample and hold, sweep and lock of the second pump laser for each tooth between the first tooth and the desired tooth to incrementally step the second pump laser from the first tooth to the desired tooth; and after each respective lock of the second pump to each respective tooth between the first tooth and the desired tooth, re-lock a tooth of the coarse optical frequency comb to the fourth tooth of the fine optical frequency comb, wherein the tooth of the coarse optical frequency comb is a tooth that is an equal number of teeth away from the respective tooth to which the second pump is locked as the third tooth is away from the first tooth.

Example 8 includes the optical frequency synthesizer of any of Examples 6-7, wherein the third tooth is locked to the fourth tooth by setting a free spectral range (FSR) of a resonator for the coarse optical frequency comb such that a beat frequency between a mixing of the fine optical frequency comb and a coarse optical frequency comb corresponds to the third tooth being aligned with the fourth tooth.

Example 9 includes the optical frequency synthesizer of any of Examples 1-8, wherein a frequency spacing of the coarse optical frequency comb is at least 10 times larger than a frequency spacing of the fine optical frequency comb.

Example 10 includes the optical frequency synthesizer of any of Examples 1-9, wherein the fine optical frequency comb does not span an octave.

Example 11 includes the optical frequency synthesizer of any of Examples 1-10, wherein the radio frequency reference is derived from one of parametric seeding of a resonator or a closed loop servo control of a resonator.

Example 12 includes a method of tuning an optical frequency synthesizer, the method comprising: providing a coarse optical frequency comb pumped with a first pump laser, wherein an absolute frequency of at least one tooth of the coarse optical frequency comb is set; providing a fine optical frequency comb having a frequency spacing between teeth that is locked to a fractional or integer multiple of a radio frequency reference, the fine optical frequency comb pumped with a second pump laser, wherein the second pump laser is initially locked to a first tooth of the coarse optical frequency comb; sweeping the second pump laser to near a desired tooth of the coarse optical frequency comb; locking the second pump laser to the desired tooth; and generating an output signal based on a tooth of fine optical frequency comb after the second pump is locked to the desired tooth.

Example 13 includes the method of Example 12, comprising: repeating the sweeping and locking of the second pump laser for each tooth between the first tooth and the desired tooth to incrementally step the second pump laser from the first tooth to the desired tooth.

Example 14 includes the method of Example 12, wherein sweeping the second pump laser includes sweeping the second pump laser from the first tooth, and while sweeping the second pump laser, counting any teeth of the coarse optical frequency comb that the second pump laser passes, and determining that the second pump laser is near the desired tooth based on the number of teeth that have been passed during the sweeping.

Example 15 includes the method of Example 14, wherein counting any teeth includes identifying any teeth by detecting a resulting beat note from a mixing of the fine optical frequency comb with the coarse optical frequency comb.

Example 16 includes the method of Example 15, comprising turning off sidebands of the fine optical frequency comb during the mixing.

Example 17 includes the method of any of Examples 12-16, wherein a third tooth of the coarse optical frequency comb is initially locked to a fourth tooth of the fine optical frequency comb with a servo loop such that the fine optical frequency comb and the coarse optical frequency comb are mutually-referenced, the method comprising: sampling and holding the servo loop prior to the sweep and lock of the second pump laser to the second tooth; and after locking the second pump laser to the desired tooth, re-locking a fifth tooth of the coarse optical frequency comb to the fourth tooth of the fine optical frequency comb, wherein the fifth tooth is an equal number of teeth away from the desired tooth as the third tooth is away from the first tooth.

Example 18 includes the method of Example 17, comprising: repeating the sampling and holding, sweeping and locking of the second pump laser for each tooth between the first tooth and the desired tooth to incrementally step the second pump laser from the first tooth to the desired tooth; and after each respective lock of the second pump to each respective tooth between the first tooth and the desired tooth, re-locking a tooth of the coarse optical frequency comb to the fourth tooth of the fine optical frequency comb, wherein the tooth of the coarse optical frequency comb is a tooth that is an equal number of teeth away from the respective tooth to which the second pump is locked as the third tooth is away from the first tooth.

Example 19 includes a method of tuning an optical frequency synthesizer, the method comprising: providing a coarse optical frequency comb having a frequency offset set by self-referencing two teeth of the coarse optical frequency comb, the coarse optical frequency comb pumped with a first pump laser; providing a fine optical frequency comb having a frequency spacing between teeth that is locked to a fractional or integer multiple of a radio frequency reference, the fine optical frequency comb pumped with a second pump laser, wherein the second pump laser is initially locked to a first tooth of the coarse optical frequency comb; wherein a frequency spacing of the coarse optical frequency comb is initially locked to a multiple of a frequency spacing of the fine optical frequency comb with a servo loop; sampling and holding the servo loop; while the servo loop is being held: sweeping the second pump laser to an adjacent tooth to a previously locked tooth of the coarse optical frequency comb, wherein the previously locked tooth is the tooth to which the second pump laser was locked while the servo loop was sampled and held, wherein the adjacent tooth is a tooth in a direction towards a desired tooth; and locking the second pump laser to the adjacent tooth; after locking the second pump laser to the adjacent tooth, re-locking the frequency spacing of the coarse optical frequency comb to the multiple of the frequency spacing of the fine optical frequency comb with the servo loop; if the adjacent tooth is not the desired tooth, repeating the sampling and holding, sweeping, locking the second pump laser, and re-locking the frequency spacing until the adjacent tooth is the desired tooth; and if the adjacent tooth is the desired tooth, generating an output signal based on a tooth of fine optical frequency comb after the second pump is locked to the desired tooth and the frequency spacing of the coarse optical frequency comb is locked to the multiple of the frequency spacing of the fine optical frequency comb.

Example 20 includes the method of Example 19, wherein the frequency spacing of the coarse optical frequency comb is initially locked to the multiple of the frequency spacing of the fine optical frequency comb by locking a third tooth of the coarse optical frequency comb to a fourth tooth of the fine optical frequency comb with the servo loop, wherein re-locking the frequency spacing of the coarse optical frequency comb to the multiple of the frequency spacing of the fine optical frequency comb includes locking a tooth adjacent to a second previously locked tooth of the coarse optical frequency comb to the fourth tooth of the fine optical frequency comb with the servo loop, wherein the second previously locked tooth is the tooth that was locked to the fourth tooth when the servo loop was sampled and held.

What is claimed is:
1. An optical frequency synthesizer comprising:
a coarse optical frequency comb pumped with a first pump laser, wherein an absolute frequency of at least one tooth of the coarse optical frequency comb is set;
a fine optical frequency comb having a frequency spacing between teeth that is locked to a fractional or integer multiple of a radio frequency reference, the fine optical frequency comb pumped with a second pump laser, wherein the second pump laser is initially locked to a first tooth of the coarse optical frequency comb; and
an output laser;
wherein the optical frequency synthesizer is configured to:
sweep the second pump laser to near a desired tooth of the coarse optical frequency comb;
lock the second pump laser to the desired tooth; and
generate an output signal with the output laser based on a tooth of fine optical frequency comb after the second pump laser is locked to the desired tooth.

2. The optical frequency synthesizer of claim 1, wherein the optical frequency synthesizer is configured to repeat the sweep and lock of the second pump laser for each tooth between the first tooth and the desired tooth to incrementally step the second pump laser from the first tooth to the desired tooth.

3. The optical frequency synthesizer of claim 1, wherein sweep the second pump laser includes sweep the second pump laser from the first tooth, and while sweeping the second pump laser, count any teeth of the coarse optical frequency comb that the second pump laser passes, and determine that the second pump laser is near the desired tooth based on the number of teeth that have been passed during the sweep.

4. The optical frequency synthesizer of claim 3, wherein count any teeth includes identify any teeth by detecting a resulting beat note from a mixing of the fine optical frequency comb with the coarse optical frequency comb.

5. The optical frequency synthesizer of claim 4, wherein the optical frequency synthesizer is configured to turn off sidebands of the fine optical frequency comb during the mixing.

6. The optical frequency synthesizer of claim 1, wherein a third tooth of the coarse optical frequency comb is initially locked to a fourth tooth of the fine optical frequency comb with a servo loop such that the fine optical frequency comb and the coarse optical frequency comb are mutually-referenced, wherein the optical frequency synthesizer is configured to:
  sample and hold the servo loop prior to the sweep and lock of the second pump laser to the desired tooth; and
  after the lock of the second pump laser to the desired tooth, re-lock a fifth tooth of the coarse optical frequency comb to the fourth tooth of the fine optical frequency comb, wherein the fifth tooth is an equal number of teeth away from the desired tooth as the third tooth is away from the first tooth.

7. The optical frequency synthesizer of claim 6, wherein the optical frequency synthesizer is configured to:
  repeat the sample and hold, sweep and lock of the second pump laser for each tooth between the first tooth and the desired tooth to incrementally step the second pump laser from the first tooth to the desired tooth; and
  after each respective lock of the second pump laser to each respective tooth between the first tooth and the desired tooth, re-lock a tooth of the coarse optical frequency comb to the fourth tooth of the fine optical frequency comb, wherein the tooth of the coarse optical frequency comb is a tooth that is an equal number of teeth away from the respective tooth to which the second pump laser is locked as the third tooth is away from the first tooth.

8. The optical frequency synthesizer of claim 6, wherein the third tooth is locked to the fourth tooth by setting a free spectral range (FSR) of a resonator for the coarse optical frequency comb such that a beat frequency between a mixing of the fine optical frequency comb and a coarse optical frequency comb corresponds to the third tooth being aligned with the fourth tooth.

9. The optical frequency synthesizer of claim 1, wherein a frequency spacing of the coarse optical frequency comb is at least 10 times larger than a frequency spacing of the fine optical frequency comb.

10. The optical frequency synthesizer of claim 1, wherein the fine optical frequency comb does not span an octave.

11. The optical frequency synthesizer of claim 1, wherein the radio frequency reference is derived from one of parametric seeding of a resonator or a closed loop servo control of a resonator.

12. A method of tuning an optical frequency synthesizer, the method comprising:
  providing a coarse optical frequency comb pumped with a first pump laser, wherein an absolute frequency of at least one tooth of the coarse optical frequency comb is set;
  providing a fine optical frequency comb having a frequency spacing between teeth that is locked to a fractional or integer multiple of a radio frequency reference, the fine optical frequency comb pumped with a second pump laser, wherein the second pump laser is initially locked to a first tooth of the coarse optical frequency comb;
  sweeping the second pump laser to near a desired tooth of the coarse optical frequency comb;
  locking the second pump laser to the desired tooth; and
  generating an output signal based on a tooth of fine optical frequency comb after the second pump laser is locked to the desired tooth.

13. The method of claim 12, comprising:
  repeating the sweeping and locking of the second pump laser for each tooth between the first tooth and the desired tooth to incrementally step the second pump laser from the first tooth to the desired tooth.

14. The method of claim 12, wherein sweeping the second pump laser includes sweeping the second pump laser from the first tooth, and while sweeping the second pump laser, counting any teeth of the coarse optical frequency comb that the second pump laser passes, and determining that the second pump laser is near the desired tooth based on the number of teeth that have been passed during the sweeping.

15. The method of claim 14, wherein counting any teeth includes identifying any teeth by detecting a resulting beat note from a mixing of the fine optical frequency comb with the coarse optical frequency comb.

16. The method of claim 15, comprising turning off sidebands of the fine optical frequency comb during the mixing.

17. The method of claim 12, wherein a third tooth of the coarse optical frequency comb is initially locked to a fourth tooth of the fine optical frequency comb with a servo loop such that the fine optical frequency comb and the coarse optical frequency comb are mutually-referenced, the method comprising:
  sampling and holding the servo loop prior to the sweep and lock of the second pump laser to the desired tooth; and
  after locking the second pump laser to the desired tooth, re-locking a fifth tooth of the coarse optical frequency comb to the fourth tooth of the fine optical frequency comb, wherein the fifth tooth is an equal number of teeth away from the desired tooth as the third tooth is away from the first tooth.

18. The method of claim 17, comprising:
  repeating the sampling and holding, sweeping and locking of the second pump laser for each tooth between the first tooth and the desired tooth to incrementally step the second pump laser from the first tooth to the desired tooth; and
  after each respective lock of the second pump to each respective tooth between the first tooth and the desired tooth, re-locking a tooth of the coarse optical frequency comb to the fourth tooth of the fine optical frequency comb, wherein the tooth of the coarse optical frequency comb is a tooth that is an equal number of teeth away from the respective tooth to which the second pump is locked as the third tooth is away from the first tooth.

19. A method of tuning an optical frequency synthesizer, the method comprising:
  providing a coarse optical frequency comb having a frequency offset set by self-referencing two teeth of the coarse optical frequency comb, the coarse optical frequency comb pumped with a first pump laser;
  providing a fine optical frequency comb having a frequency spacing between teeth that is locked to a fractional or integer multiple of a radio frequency reference, the fine optical frequency comb pumped with a second pump laser, wherein the second pump laser is initially locked to a first tooth of the coarse optical frequency comb;

wherein a frequency spacing of the coarse optical frequency comb is initially locked to a multiple of a frequency spacing of the fine optical frequency comb with a servo loop;

sampling and holding the servo loop;

while the servo loop is being held:
- sweeping the second pump laser to an adjacent tooth to a previously locked tooth of the coarse optical frequency comb, wherein the previously locked tooth is the tooth to which the second pump laser was locked while the servo loop was sampled and held, wherein the adjacent tooth is a tooth in a direction towards a desired tooth; and
- locking the second pump laser to the adjacent tooth;

after locking the second pump laser to the adjacent tooth, re-locking the frequency spacing of the coarse optical frequency comb to the multiple of the frequency spacing of the fine optical frequency comb with the servo loop;

if the adjacent tooth is not the desired tooth, repeating the sampling and holding, sweeping, locking the second pump laser, and re-locking the frequency spacing until the adjacent tooth is the desired tooth; and if the adjacent tooth is the desired tooth, generating an output signal based on a tooth of fine optical frequency comb after the second pump laser is locked to the desired tooth and the frequency spacing of the coarse optical frequency comb is locked to the multiple of the frequency spacing of the fine optical frequency comb.

20. The method of claim 19, wherein the frequency spacing of the coarse optical frequency comb is initially locked to the multiple of the frequency spacing of the fine optical frequency comb by locking a third tooth of the coarse optical frequency comb to a fourth tooth of the fine optical frequency comb with the servo loop, wherein re-locking the frequency spacing of the coarse optical frequency comb to the multiple of the frequency spacing of the fine optical frequency comb includes locking a tooth adjacent to a second previously locked tooth of the coarse optical frequency comb to the fourth tooth of the fine optical frequency comb with the servo loop, wherein the second previously locked tooth is the tooth that was locked to the fourth tooth when the servo loop was sampled and held.

* * * * *